Figure 1:
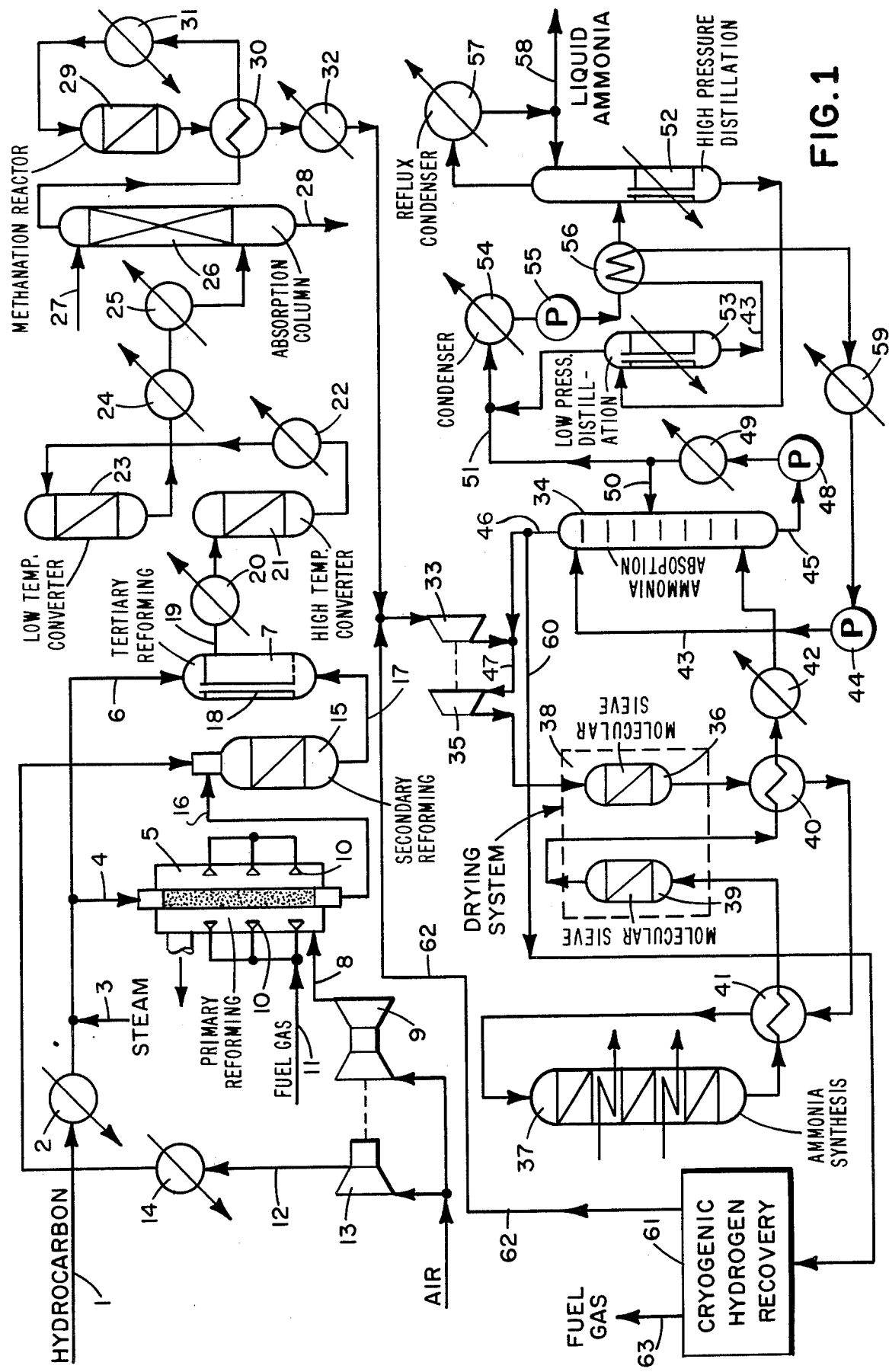

United States Patent [19]

Pagani et al.

[11] 4,376,758

[45] Mar. 15, 1983

[54] PROCESS FOR SYNTHESIZING AMMONIA FROM HYDROCARBONS

[75] Inventors: Giorgio Pagani; Dino Bosco; Lorenzo Brambilla, all of Milan, Italy

[73] Assignee: Montedison S.p.A., Milan, Italy

[21] Appl. No.: 222,988

[22] Filed: Jan. 6, 1981

[30] Foreign Application Priority Data

Jan. 8, 1980 [IT] Italy ............................... 19076 A/80

[51] Int. Cl.³ ............................................. C01C 1/04
[52] U.S. Cl. ....................................... 423/359; 203/75; 252/373; 252/376
[58] Field of Search ...................... 423/359, 360, 361; 203/36, 74, 75; 252/373, 376, 375

[56] References Cited

U.S. PATENT DOCUMENTS

| | | | |
|---|---|---|---|
| 2,519,451 | 8/1950 | Fulton | 203/75 |
| 3,397,962 | 8/1968 | Squires | 252/373 |
| 3,685,977 | 8/1972 | Goodman | 48/95 |
| 4,079,017 | 3/1978 | Crawford et al. | 252/373 |
| 4,148,866 | 4/1979 | Becker | 423/359 |

FOREIGN PATENT DOCUMENTS

42-15376  8/1967  Japan .

Primary Examiner—O. R. Vertiz
Assistant Examiner—Wayne A. Langel
Attorney, Agent, or Firm—Stevens, Davis, Miller & Mosher

[57] ABSTRACT

A process for synthesizing ammonia is disclosed comprising the steps of generating the synthesis gas from hydrocarbons by the primary reforming of said hydrocarbon with steam and by the secondary reforming of the resulting gaseous mixture with oxygen; subjecting a portion of the starting hydrocarbon mixed with the steam to a tertiary reforming in which the necessary heat is provided by the gaseous reaction mixture leaving the secondary reforming; causing the ammonia synthesis to occur at low pressure with drying of the gas sent to the synthesis reactor by employing a molecular sieve; causing the ammonia contained in the reacted gas to be absorbed by water; and subjecting the ammonia solution so obtained to a distillation which may be a conventional distillation step or one effected by means of two distillation columns operating at different pressures.

11 Claims, 2 Drawing Figures

PROCESS FOR SYNTHESIZING AMMONIA FROM HYDROCARBONS

This invention relates to a process for synthesizing ammonia from hydrocarbons; and more particularly to a process for synthesizing ammonia comprising the step of generating the synthesis gas from hydrocarbons by the reforming of said hydrocarbons with steam and oxygen.

As is well known, the reaction of the hydrocarbon with steam is called primary reforming and is an endothermic reaction, while the reaction of the hydrocarbon with oxygen, which is generally introduced into the process in the form of air in order to directly obtain the nitrogen-containing synthesis mixture ($3H_2+N_2$), is called secondary reforming and is an exothermic reaction.

As is well known, ammonia is one of the mass products having a high energy content which requires a considerable waste of energy for obtaining it.

It is well known that the actual energy consumption to produce 1 kg of ammonia is remarkably higher than the minimum theoretical stoichiometrically necessary, even assuming recovery of the reaction heat.

The ratio between said minimum theoretical value and the actual energy consumption indicates the efficiency degree of any given process.

The world energy shortage and the consequent increase in the price of energy cause the problem of reducing the energy requirements of processes for producing ammonia to be widely felt.

The latest high-capacity ammonia plants, based on steam reforming processes of the hydrocarbons and perfected with integrated heat recovery cycles and with the operation of the main devices by means of steam turbines, exhibit an efficiency degree of at best about 50%-55%, which means that at present, in spite of the efforts made and the improvements already brought about, the actual energy consumption to produce 1 kg of ammonia is still about double the minimum theoretically necessary.

It is therefore important to try still further to reduce the energy consumption in the ammonia production plants.

It is an object of the present invention to provide a process for synthesizing ammonia from hydrocarbons which permits one still further to reduce the energy consumption and therefore a process that exhibits a high efficiency degree.

This and still other objects, which those skilled in the art will easily understand from the following detailed description, are advantageously achieved by an ammonia synthesis process which comprises generating the synthesis gas from hydrocarbons by the primary reforming of said hydrocarbons with steam and by the secondary reforming of the resulting gaseous mixture with oxygen, such process being characterized in that it comprises the steps of subjecting a part of the starting hydrocarbon mixed with the steam to a tertiary reforming in which the necessary heat is provided by the gaseous reaction mixture leaving the secondary reforming; causing the ammonia synthesis to occur at low pressure with drying of the gas sent to the synthesis reactor by using molecular sieves; causing the ammonia contained in the reacted gas to be absorbed with water; and subjecting ammonia solution so obtained to distillation to obtain a relatively highly concentrated ammonia product.

Preferably the tertiary reforming is of the mixing type, i.e. of the type in which the reformed gaseous mixture, which forms by flowing inside the pipes containing the catalyst of said tertiary reformer, directly mixes, before the heat exchange occurs, with the gaseous reaction mixture leaving the secondary reforming, such mixture providing, from outside the pipes, the heat necessary for said tertiary reforming.

In this way the tertiary reformer permits a considerable simplification in structure, which offers the advantage of having no tube sheets at high temperature and of having pipes at a perfectly balanced pressure in the warmest point and therefore not subjected to mechanical stresses.

The ammonia synthesis is conducted at an absolute pressure lower than 100 kg/cm$^2$, and preferably at a pressure ranging form 40 to 80 kg/cm$^2$, thus considerably reducing the amount of energy required to compress the synthesis mixture to operating pressures.

The gas conveyed to the synthesis reactor is dried by employing molecular sieves, the regeneration of which is effected, by stripping of the water and of the residual ammonia adsorbed, by at least a portion of the reacted gas flowing from the ammonia synthesis reactor, which is subsequently sent to the ammonia absorption with water.

In this manner it is possible to utilize the temperature variation of the gas from the outlet of the synthesis reactor (dry at about 420° C.) to the outlet of the ammonia absorber with water (wet at about 40° C.) in order to carry out, under isobaric conditions, both operations of gas drying and of regeneration of the adsorbing masses of the molecular sieves without requiring any supply of heat and of refrigeration units from outside the system.

Furthermore this permits one to reduce to the minimum the ammonia content in the gas sent to the synthesis reactor—such gas coming from the fresh synthesis mixture produced by the hydrocarbons to which the deammoniated gas leaving the ammonia absorber with water is added prior to said drying—which is of great importance in order to achieve a good conversion yield, particularly in an ammonia production plant operating at low pressure.

The ammonia solution deriving from the ammonia absorption with water is subjected to distillation preferably carried out by utilizing two columns operating at different pressures, in which the solution to be distilled is conveyed, after mixing with the ammonia vapors flowing from the top of the column operating at lower pressure, to the column operating at higher presssure, from the bottom of which the partially distilled ammonia solution is sent to the column operating at lower pressure; the liquid ammonia is recovered at the top of the column operating at higher pressure, while the residual solution is drawn from the bottom of the column operating at lower pressure.

In this way it is possible to carry out the distillation at low temperature levels, for example at temperatures approximately ranging from 130° to 140° C., and thus permitting one to utilize recovery heat at a low thermal level, which is generally available in large amounts in the modern ammonia production lines.

Figure 2:
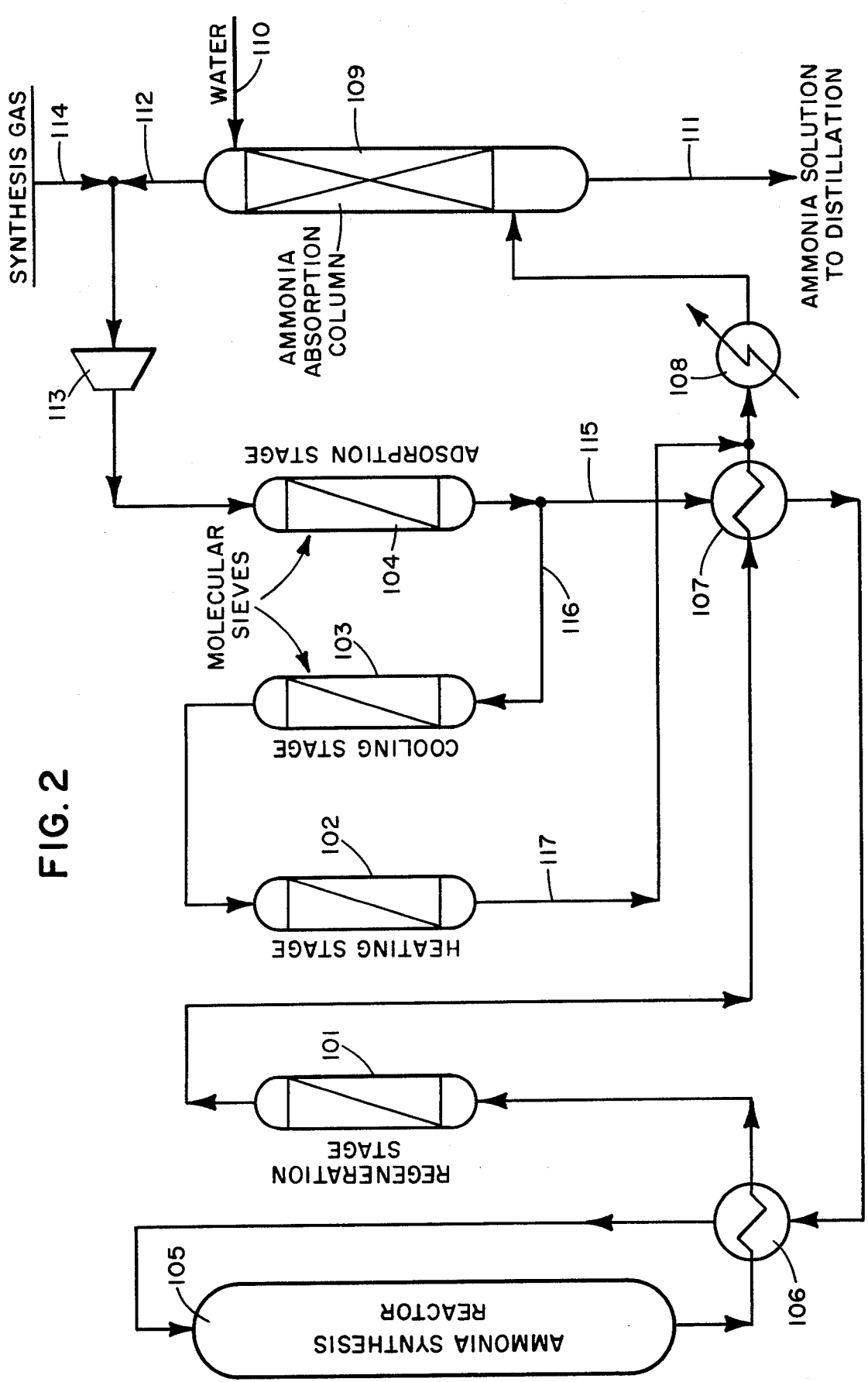

The present invention will be now described more in detail making reference to the attached drawings in which:

FIG. 1 shows schematically an embodiment of the process according to this invention; and FIG. 2 shows schematically an embodiment of the drying system for the gas sent to the ammonia synthesis reactor in a process according to this invention.

With reference to FIG. 1, the starting hydrocarbon, consisting of natural gas, fed to 1, after preheating in 2 and mixing with steam from 3, is conveyed in part, through line 4, to primary reforming 5 while the remaining part (about 40%–50%) is conveyed, through line 6, to tertiary reforming 7.

8 indicates the hot fumes, rich in oxygen, let off by gas turbine 9 which operates process air compressor 13. These fumes 8 are the combustion medium of the furnace of primary reforming 5, while 10 indicates the burners for fuel gas 11.

12 indicates the air which, after compression in 13 and after preheating in 14, is fed to secondary reforming 15, to which gaseous mixture 16 leaving primary reforming 5 is fed.

Air feeding is suitably proportioned so that the final gaseous mixture may have the composition required for the ammonia synthesis.

Gaseous mixture 17 at high temperature leaving secondary reforming 15 is made to flow to tertiary reforming 7.

Tertiary reforming 7 is of the mixing type, i.e. of the type in which the reformed mixture, which is produced by flowing inside tubes 18 containing the catalyst, directly mixes, prior to the heat exchange, with gaseous mixture 17 which provides the heat necessary for said reforming. More particularly, the tubes 18 are fastened only at their upper ends to a tube sheet (not marked) while at their lower ends there is no similar tube sheet. By this structure the tertiary reformer 7 is of the mixing type and operates as follows: The hydrocarbon 1 mixed with steam 3 (the reforming mixture) is conveyed in part, through line 6, to flow inside tubes 18 containing the catalyst where reforming reactions occur. The catalyst is retained within the tubes 18 by a net or a tube-perforated sheet (not shown in the drawing) and located at the lower end of the tubes 18. The reformed gaseous mixture flowing out of the tubes 18 mixes directly with gaseous mixture 17 at high temperature coming from secondary reforming 15. The resulting overall gaseous mixture, flowing outside tubes 18, provides the heat necessary for the reforming reactions occurring inside tubes 18. The catalyst is of course retained within the tubes 18 by the net or tube-perforated sheet not shown in the drawing and located at the lower end of the tubes 18.

Gaseous reaction mixture 19 leaving tertiary reforming 7 is conveyed, after cooling in 20, to high temperature converter 21 and from there, after further cooling in 22, to low temperature converter 23.

The known conversion reaction, between carbon monoxide and steam to produce hydrogen and carbon dioxide, occurs in reactors or converters 21 and 23.

From converter 23 the process gaseous mixture is conveyed, after cooling in 24 and 25, to absorption column 26, where, as is known, it is purified from most of the carbon dioxide contained in said mixture by means of an appropriate gas scrubbing solution known per se, fed to 27. Conventional scrubbing solutions that may be employed include hot aqueous alkaline carbonate solutions, aqueous ethanolamine solutions, etc. The aqueous gas scrubbing solution flowing from column bottom 28 is regenerated in a manner well known per se and for simplicity not shown in the drawing.

The process gaseous mixture, or synthesis gas, is then sent from the top of column 26 to methanation reactor 29, after being preheated through heat exchanger 30, using the heat of the gaseous mixture leaving said reactor, and through exchanger 31.

The known catalytic methanation reactions occur in reactor 29. These reactions are exothermic and, as is well known, lead to the elimination, by reaction with hydrogen, of the carbon monoxide and carbon dioxide still contained in the gaseous mixture.

The synthesis gas so generated is further cooled in cooler 32. Said gas, which constitutes the fresh synthesis mixture produced from the hydrocarbons, is then compressed to an absolute pressure below 100 kg/cm$^2$ by compressor 33.

Such gas, to which is added the deammoniated gas flowing from the top of absorber 34 of ammonia with water, is conveyed, after compression by means of compressor 35, to molecular sieve 36 which, in the operation cycle illustrated in the figure, is in the adsorption stage. Here the gas is dried before being sent to ammonia synthesis reactor 37.

Drying system 38, shown in the figure, consists of two molecular sieves 36 and 39. In such system, while one molecular sieve is in the adsorption stage, the other is in the regeneration stage.

In the operation cycle shown in the figure, the water contained in the gas is adsorbed in molecular sieve 36 and the gas, so dried, is made to flow to ammonia synthesis reactor 37 after having been preheated in heat exchangers 40 and 41.

The reacted gas, flowing from reactor 37, enters exchanger 41 where it cools down to a temperature suitable for the regeneration of the molecular sieves, and thus preheating, as mentioned hereinbefore, the dried gas coming from molecular sieve 36.

The reacted gas leaving exchanger 41 is sent to molecular sieve 39 which, in the operation cycle shown in the figure is in the regeneration stage.

During such regeneration the gas effects the stripping of the water as well as of the residual ammonia, previously adsorbed when molecular sieve 39 was operating in the synthesis gas drying stage.

The gas leaving molecular sieve 39, after being further preheated in heat exchanger 40, the dried gas flowing from molecular sieve 36 is cooled in 42 and then sent to the absorption of ammonia with water in column 34.

Aqueous absorption solution 43 coming, through pump 44, from the distillation of the ammonia solution—as will be illustrated hereinafter—is fed to the top of column 34, from the bottom of which ammonia solution 45, to be sent to distillation, is withdrawn.

As mentioned hereinabove, deammoniated gas 46, which is then added to fresh synthesis mixture 47, flows from the top of column 34.

According to such drying cycle, all the water which, during the ammonia absorption in absorber 34, goes to saturate gas 46, as well as the water, if any, contained in fresh mixture 47, is made to flow back to adsorption in a simple and effective manner.

The residual ammonia adsorbed, if that is the case, during the gas drying stage, is also conveyed back to the absorption column 34.

Ammonia solution 45 obtained at the bottom of column 34 is sent by pump 48 to cooler 49, from which a portion 50 is recycled to 34 and a portion 51 is sent to distillation. This distillation may be a conventional distillation system or, preferably, a system employing two distillation columns one of which operates at a relatively high pressure and the other at a relatively low pressure, as more fully described in a companion Pagani et al. application Ser. No. 222,989, filed of even date herewith, and corresponding to Italian application No. 19075, A/80 (Case A.2807).

More specifically, distillation is preferably carried out in two columns 52 and 53 operating at different pressures.

Ammonia solution 51 to be distilled, after mixing with the ammonia vapors flowing from the top of column 53 operating at a pressure lower than that of column 52, is expanded and conveyed to condenser 54, in which the vapors are condensed.

The resulting ammonia solution, more concentrated in ammonia than the starting solution, is sent through pump 55 to column 52 operating at a pressure higher than that of 53, after having been preheated in 56 at the expense of the residual solution withdrawn from the bottom of column 53.

In distillation column 52, preferably of the downflowing film type in its lower section and of the tray type in its upper section, such solution is partially distilled up to an ammonia concentration consistent with the operating pressure and with the maximum temperature to be reached.

From the bottom of column 52 the partially distilled ammonia solution is sent to comumn 53 operating at lower pressure, where its ammonia concentration is reduced to the desired value.

The ammonia vapors rising in the lower section of column 52 are rectified in the upper tray-type section and condensed in reflux condenser 57, in order to obtain liquid ammonia 58 at 99.9% by weight.

Column 53 operating at lower pressure is also preferably of the downflowing film type.

Residual solution 43 coming from the bottom of column 53, after heat recovery in 56 and final cooling in 59, is sent back to ammonia absorption at the top of column 34.

The ammonia vapors released in column 53 are mixed, as already explained, with ammonia solution 51 to be distilled.

By virtue of the cycle described above it is possible to distill the ammonia solution supplying heat at a low thermal level (for example at temperatures in the approximate range of 130° to 140° C.). The utilization of film type distillation columns allows one not only to cause the heat and substance exchange to occur on one surface only, but also (and this is very important) to supply heat in countercurrent at mean levels below the maximum distillation temperature.

A portion of deammoniated gas 46 flowing from the top of absorption column 34 is removed in 60 and conveyed to hydrogen recovery unit 61, which comprises a conventional cryogenic fractionation unit.

Recovered hydrogen 62 is recycled to the fresh synthesis mixture, while the remaining fraction 63 is utilized as fuel gas.

In a plant of the type shown in FIG. 1 having available natural gas 1 at a pressure of 45 kg/cm$^2$ abs., carrying out the preparation of the synthesis gas at about 40 kg/cm$^2$ abs. and the ammonia synthesis at 60 kg/cm$^2$ abs. With production of non-refrigerated liquid ammonia 58 at 99.9%, an efficiency degree equal to about 65% has been attained.

FIG. 2 shows another embodiment of the drying system 38 illustrated in FIG. 1. In such a system the gas drying is effected, before sending the gas to the synthesis reactor, by utilizing four molecular sieves, which individually, and alternately in each operation cycle, are one in the regeneration stage, one in the heating stage, one in the cooling stage and one in the adsorption stage.

The molecular sieve in the heating stage is heated by using the heat withdrawn from the molecular sieve in cooling stage.

Referring to FIG. 2, where 101, 102, 103 and 104 indicate four molecular sieves, the reacted gas leaving the bottom of ammonia synthesis reactor 105 (corresponding in function to reactor 37 of FIG. 1) passes through heat exchanger 106, where it is cooled down to a temperature suited to the regeneration of the molecular sieves, with simultaneous preheating of the dried gas flowing from molecular sieve 104 which, in the operation cycle shown in the figure, is in the adsorption stage. The dried gas so preheated is sent to the top of synthesis reactor 105.

The reacted gas leaving exchanger 106 is sent to molecular sieve 101 which, in the operation cycle shown in the figure, is in the regeneration stage. The gas flowing from molecular sieve 101, after having been further preheated in heat exchanger 107 against the dried gas coming from molecular sieve 104, is cooled in heat exchanger 108 and then sent to the absorption of ammonia with water in column 109.

Water 110 necessary for the absorption is fed to the top of column 109, from the bottom of which ammonia solution 111 is withdrawn and sent to distillation.

Deammoniated and water-saturated gas 112 flows out from the top of column 109. Such gas, after compression by means of compressor 113, is sent to molecular sieve 104 which, as explained above, is in the adsorption stage.

The fresh synthesis mixture, coming from the unit for the generation of the synthesis gas from hydrocarbons, is added in 114 (corresponding to the effluent from cooler 32 of FIG. 1) to the deammoniated gas 112 before conveying such gas to molecular sieve 104.

In molecular sieve 104 the water contained in the gas is fully adsorbed.

Most of the gas thus dried, about 95%, is conveyed through line 115 to the ammonia synthesis reactor 105 after having been preheated in heat exchangers 107 and 106. A pair of the dried gas coming from the molecular sieve 104, about 5%, is sent, conversely, through line 116 to molecular sieve 103 which, in the operation cycle shown in the figure, is in the cooling stage, and from such sieve it is sent to molecular sieve 102 which, in the operation cycle shown in the figure, is in the heating stage.

In fact, the gas of line 116 withdraws heat from the hot mass of molecular sieve 103, regenerated in the preceding operation cycle as will be explained hereinafter, and transfers such heat to the cold mass of molecular sieve 102 to be regenerated in the successive operation cycle, as will be explained hereinafter.

The gas flowing from molecular sieve 102 is admixed, through line 117, with the gas leaving molecular sieve 101 which, as indicated hereinbefore, is in the regeneration stage, and it is sent, along with the latter gas, through exchanger 108 to absorber 109.

In this way all of the water which, during the ammonia absorption in absorber 109, goes to saturate the gas 112, as well as the water, if any, contained in fresh mixture 114, is conveyed back to the absorption zone in a simple and effective manner.

Also residual ammonia optionally adsorbed during the drying stage of gas 112 is sent back to the absorption zone.

In fact, as previously indicated, both the gas flowing from molecular sieve 101 and the gas flowing from molecular sieve 102 are sent to absorber 109.

After a predetermined time, the above-described operation cycle of molecular sieves 101, 102, 103 and 104 is commuted in such manner that, subject to the foregoing sequence, it is molecular sieve 102 which is in the regeneration stage while molecular sieves 101, 103 and 104 are respectively in the cooling stage, in the adsorption stage and in the heating stage.

Such commutation is effected by means well known per se and not indicated in the figure for simplicity's sake, and it is carried out, always referring to the operation cycle shown in the figure, when the temperature of molecular sieve 102 is close to that of molecular sieve 101 and that of molecular sieve 103 is nearly equal to the temperature of molecular sieve 104.

The commutation of the operation cycle occurs in a simple way without causing thermal unbalances. Neither does it cause such commutation pressure unbalances since the operation cycle is of the isobar type inasmuch as the molecular sieve which is in the adsorption stage operates on the delivery of compressor 113, while the other three molecular sieves are balanced by the pressure existing at the outlet of ammonia synthesis reactor 105. This makes pollution of the dried gas by the wet gas impossible.

The frequency of commutation of the operation cycle of the molecular sieves in general is very high, for instance every hour, thereby making possible a drastic reduction in the dimensions of the molecular sieves themselves, by which is meant the structural dimensions of the apparatus and the amount of molecular sieve material required.

Nevertheless the duration of the operation cycle, as well as the regeneration temperature of the molecular sieves, are chosen as a function of the type of the adsorption mass of the molecular sieves.

With reference to the attached FIG. 2, the possible sequences of the operation cycle of molecular sieves 101, 102, 103 and 104 are four, as shown in the following table:

| Molecular sieve in the stage of: | Operation cycle | | | |
|---|---|---|---|---|
| | A | B | C | D |
| adsorption | 104 | 103 | 101 | 102 |
| cooling | 103 | 101 | 102 | 104 |
| heating | 102 | 104 | 103 | 101 |
| regeneration | 101 | 102 | 104 | 103 |

From the above table it follows that operation cycle A—which is the one shown in the attached FIG. 2 described above in which, while molecular sieve 101 is in the regeneration stage, molecular sieve 104 is in the adsorption stage and molecular sieves 103 and 102 are respectively in the cooling stage and in the heating stage—is followed by operation cycle B, then by C and finally by D which precedes A and so on. In this way the four molecular sieves 101, 102, 103 and 104 are individually, and alternately in each operating cycle, one in the regeneration stage, one in the heating stage, one in the cooling stage, and one in the adsorption stage.

The following example is given simply still better to illustrate the gas drying feature of one embodiment of the present invention:

With reference to the embodiment of FIG. 2 and to a synthesis plant for ammonia having an output capacity of 1,625 t/day of $NH_3$, an operating pressure is maintained of 60 Kg/sq cm absolute and a separation of the product ammonia in the form of an ammonia solution by absorption with water.

Into the top of ammonia synthesis reactor 105 there flow in 1,000,000 $Nm^3$/hr of dried gas coming from molecular sieve 104 and preheated at a temperature of 380° C. in heat exchangers 107 and 106. That dried gas has the following composition by volume:

| | |
|---|---|
| $N_2$ | 24.9% |
| $H_2$ | 74.8% |
| $NH_3$ | 0.3% |

From the bottom of reactor 105 there flow out at 420° C. 912,000 $Nm^3$/h of reacted gas which has the following composition by volume:

| | |
|---|---|
| $N_2$ | 67.5% |
| $H_2$ | 22.5% |
| $NH_3$ | 10.0% |

The heat of reaction is removed to the extent of 530,000 Kcal/t of $NH_3$, thereby producing heat recovery steam. The reacted gas, now relatively rich in ammonia, is then cooled down to 300° C. in heat exchanger 106 and then conveyed to molecular sieve 101 where the water and the previously adsorbed ammonia are stripped off. The gas leaving molecular sieve 101 is cooled down in heat exchanger 107 to a temperature of 80° C. and is then united with the gas coming from molecular sieve 102.

In this way there are obtained 963,050 $Nm_3$/hr of a gas having the following composition by volume:

| | |
|---|---|
| $N_2$ | 22.7% |
| $H_2$ | 67.7% |
| $NH_3$ | 9.6% |

This gas is conveyed to the ammonia absorption column 109, where the ammonia is absorbed with water to a residual content of 0.48% of ammonia by volume leaving the column 109. Thus from the top of column 109 there flow out 875,050 $Nm^3$/hr of a gas having the following composition by volume:

| | |
|---|---|
| $N_2$ | 24.82% |
| $H_2$ | 74.70% |
| $NH_3$ | 0.48% | and having a water content of 800 Kg/hour.

To this last-mentioned gas were added 176,000 $Nm^3$/h of fresh $N_2+3H_2$ mixture having a water content of 200 Kg/h. After compression in circulator or compressor 113, the gas was conveyed to molecular sieve 104 in which it was dried.

At the outflow from the bottom of molecular sieve 104 (in which all the water and part of the residual ammonia are adsorbed), 1,000,000 Nm$^3$/hr of gas are sent to the ammonia synthesis reactor 105 after being preheated in 107 and 106, while 50,050 Nm$^3$/hr of that gas are sent to molecular sieve 103 and from there to molecular sieve 102.

From the bottom of the absorption column 109 167,700 Kg/hr of ammonia solution (at 40% by weight of NH$_3$) are removed and forwarded to the distillation portion of the system for the production of a highly concentrated ammonia product in the manner already described.

The advantages offered by the present invention clearly appear from the preceding description.

For the sake of simplicity in the drawings, the necessary (but conventional) valves and valve controls for handling the gas and liquid flows are not shown. The catalysts employed in the various reaction zones are of course conventional and well known to those skilled in the art.

What is claimed is:

1. An ammonia synthesis process comprising the generation of synthesis gas from hydrocarbons by the primary reforming of said gases with steam and by the secondary reforming of the resulting gaseous mixture with oxygen, characterized in that it comprises the steps of subjecting a part, not passed through the primary reforming, of the starting hydrocarbon mixed with the steam to a tertiary reforming in which the necessary heat is supplied, by means of indirect heat exchange, by the gaseous reaction mixture leaving the secondary reforming; said tertiary reforming being of the mixing type in which the reformed gaseous mixture, which forms by flowing inside pipes containing the catalyst of said tertiary reformer, directly mixes, before said heat exchange occurs, with the gaseous reaction mixture leaving the secondary reforming, such mixture providing, from outside the pipes, the heat necessary for said tertiary reforming; causing the ammonia synthesis to occur at an absolute pressure lower than 100 kg/cm$^2$ with drying of the gas conveyed to the synthesis reactor by employing molecular sieves; absorbing the ammonia contained in the reacted gas with water; and subjecting the ammonia solution so obtained to distillation to obtain a relatively concentrated ammonia product.

2. A process according to claim 1, characterized in that the gas sent to the synthesis reactor is dried by molecular sieves, the regeneration of which is carried out by at least a part of the reacted gas flowing from the ammonia synthesis reactor, such gas leaving the regeneration being then sent to the absorption of ammonia with water.

3. A process according to claim 2, characterized in that said drying is obtained by employing four molecular sieves which individually, and alternately in each operation cycle, are one in the regeneration stage, one in the heating stage, one in the cooling stage, and one in the adsorption stage.

4. A process according to claim 3, characterized that the heating of the molecular sieve in the heating stage is effected by using the heat withdrawn from the molecular sieve in the cooling stage.

5. A process according to claim 4, characterized that a part of the dried gas coming from the molecular sieve in the adsorption stage is sent to the molecular sieve in the cooling stage and then to the molecular sieve in the heating stage, thereby transferring to this last molecular sieve heat withdrawn from the preceding molecular sieve.

6. A process according to claim 5, characterized in that said gas, flowing from the molecular sieve in the heating stage, is conveyed to the ammonia absorber.

7. A process according to claim 3, characterized in that the reacted gas leaving the ammonia synthesis reactor, before being sent to the molecular sieve in the regeneration stage, is cooled down by preheating the dried gas coming from the molecular sieve in the adsorption stage.

8. A process according to claim 3, characterized in that the reacted gas leaving the molecular sieve in the regeneration stage, before being sent to the absorption of ammonia with water, preheats the dried gas flowing from the molecular sieve in the adsorption stage.

9. A process according to claim 3, characterized in that the gas leaving the absorption of ammonia with water is conveyed, after compression and after addition of the fresh synthesis mixture, to the molecular sieve in the adsorption stage.

10. A process according to claim 1, characterized in that the ammonia synthesis is conducted at an absolute pressure of from 40 to 80 kg/cm$^2$.

11. A process according to claim 1, characterized in that the ammoniacal solution obtained from the absorption of ammonia with water is subjected to distillation by using two columns operating at different pressures, in which said solution to be distilled, after being mixed with the ammoniacal vapors flowing from the top of the column operating at the lower pressure, is conveyed to the column operating at the higher pressure, from the bottom of which the partially-distilled ammoniacal solution is sent to the column operating at the lower pressure; liquid ammonia is recovered at the top of the column operating at the higher pressure while the residual ammonia solution is withdrawn from the bottom of the column operating at the lower pressure.

* * * * *